(12) United States Patent
Wyatt et al.

(10) Patent No.: US 11,134,319 B1
(45) Date of Patent: Sep. 28, 2021

(54) STREAMING VIDEO DATA USING CONTRIBUTOR TRUST

(71) Applicant: Amazon Technologies, Inc., Seattle, WA (US)

(72) Inventors: Michael Wyatt, Cambridge (GB); Dhrumil Mayank Kumar Upadhyaya, Seattle, WA (US); Kelvin Li, Kent, WA (US); Kunwar Kanishk Singh, Seattle, WA (US); Kenneth Benoit, Ravensdale, WA (US)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 16/164,713

(22) Filed: Oct. 18, 2018

(51) Int. Cl.
*H04N 21/84* (2011.01)
*H04N 21/81* (2011.01)
*H04N 21/475* (2011.01)
*H04N 21/231* (2011.01)
*H04N 21/235* (2011.01)
*H04N 21/258* (2011.01)

(52) U.S. Cl.
CPC ......... *H04N 21/84* (2013.01); *H04N 21/2353* (2013.01); *H04N 21/23109* (2013.01); *H04N 21/25866* (2013.01); *H04N 21/475* (2013.01); *H04N 21/8133* (2013.01)

(58) Field of Classification Search
CPC ............. H04N 21/84; H04N 21/23109; H04N 21/2353; H04N 21/25866; H04N 21/475; H04N 21/8133
See application file for complete search history.

(56) References Cited

U.S. PATENT DOCUMENTS

| | | | | |
|---|---|---|---|---|
| 8,417,562 | B1* | 4/2013 | Siemens | G06Q 30/0218 705/7.38 |
| 2011/0078736 | A1* | 3/2011 | Thomas | H04N 21/252 725/40 |
| 2013/0226656 | A1* | 8/2013 | Sedota, Jr. | G06Q 30/0282 705/7.29 |
| 2014/0013200 | A1* | 1/2014 | White | H04N 21/235 715/230 |
| 2014/0324469 | A1* | 10/2014 | Reiner | G16H 50/20 705/3 |
| 2014/0351837 | A1* | 11/2014 | Amidei | H04N 5/44543 725/13 |
| 2019/0179956 | A1* | 6/2019 | Krasadakis | G06F 7/02 |

* cited by examiner

*Primary Examiner* — Chenea Davis
(74) *Attorney, Agent, or Firm* — Eversheds Sutherland (US) LLP

(57) ABSTRACT

Devices and methods are provided for determining video data using contributor trust scores. A device may receive first data associated with a video program, wherein the first data are received from a first contributor, the first contributor having a first reliability ranking. The device may receive second data associated with the video program, wherein the second data are received from a second contributor, the second contributor having a second reliability ranking. The device may determine that the first reliability ranking is higher than the second reliability ranking. The device may send the first data to a catalog including additional video data.

20 Claims, 6 Drawing Sheets

STREAMING VIDEO DATA USING CONTRIBUTOR TRUST

BACKGROUND

Streaming video may use a variety of information in a presentation of available content and to facilitate playback of selected content. For example, movie and television show titles, television show seasons, episodes, synopsis of an episode or movie, available languages, available subtitles, usage rights, and available video formats may provide streaming video users information which may help a user determine which content to select. In addition, video playback data such as video coding rates, video frame rates, bit rates, and video compression formats may be used to facilitate the download and playback of streaming video. Such information may be provided by multiple parties, and when many parties provide the information, some respective information may conflict. When multiple information entries conflict, a selection of one information entry over a conflicting information entry should be made.

Figure 1:
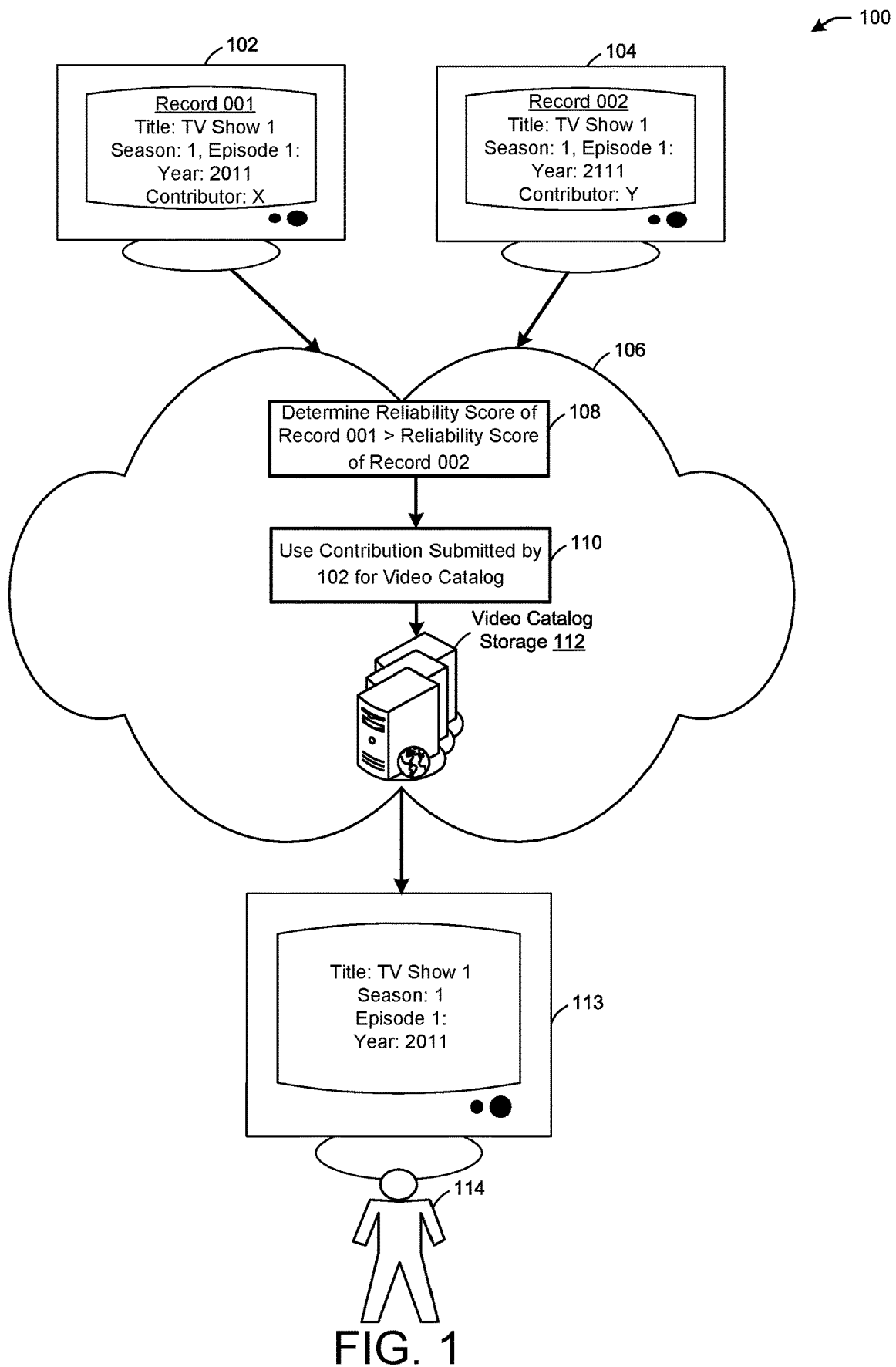
FIG. 1 illustrates an example process of determining video data using contributor trust, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for determining streaming video data using contributor trust. A streaming video system which facilitates streaming video may collect content metadata, video assets, artwork assets, content rights, and other data associated with video content. The data and assets may be provided by movie studios, other content providers, and system operators who may edit the data and assets, which may be aggregated into one or more catalogs available to users of the streaming video system (e.g., a catalog which indicates video titles available for selection and relevant data associated with the selectable video). The data and assets may be associated with movies, television shows, sporting events, etc. The same data may be received by the streaming video system from multiple sources. For example, a content provider may provide a video file for a television show, subtitle data, audio in different languages, etc. A content provider may use a third party such as a foreign language translator to provide audio and subtitles in different languages, so the streaming video system also may receive data from one or more third parties for the same content provided by the content provider. A legal team of the content provider, for example, may provide content and/or subscription rights to the streaming video system. Therefore, many different types of contributors may provide video data used to provide information to a user and to computer systems which cause video streaming and playback.

However, every data may not be accurate. For example, the date, title, and/or subtitles of a video program may be incorrect. A system operator may correct data, but after a correction is made to the catalog, a content provider may send additional data to the streaming video system that still includes the incorrect data. For example, if a typo in a video file synopsis is detected by a system operator and corrected, but the content provider later sends data which still includes the typo, then a conflict may exist. The present disclosure provides ways for a computer system to recognize and correct such conflicts.

Provider trust may be a consideration in resolving data entry conflicts for a streaming video system receiving data from a variety of sources over time. For example, a system operator's data entries may be assigned a higher reliability rating/score than the data entries received from a data provider such as a content provider. While time of a received data entry may be considered to determine which of multiple data entries is more recent, a less recent data entry may take priority over a more recent data entry at least because the reliability rating/score of the less recent entry may be higher based on the provider of the data entry. The reliability rating/score may be preset and may be adjusted over time based on usage. For example, if a first data provider is determined to be more reliable than a second data provider (e.g., less mistakes in received data are identified), then the first data provider's reliability rating/score may be adjusted higher and/or the second data provider's reliability rating/score may be adjusted lower.

It may be possible that a system operator enters incorrect data. For example, the streaming video system may receive data from a content provider, and a system operator may correct the data. The streaming video system may receive additional data from the content provider which includes the uncorrected version of the data, but the uncorrected version actually may be the correct version (e.g., the system operator's correction may have been made in error). A history of events may be kept to track the changes made, including data which is subsequently corrected. For example, an indication that at time 1, user 1 indicates data X may be logged. Another indication that at time 2, user 2 indicates that data X is really X' may be logged. This way, corrected data are not lost. Any time a new contribution (e.g., data input) is provided, then a new decision may be made to determine which version of data to use in the catalog (e.g., data X or X'). Even if the most recent entry indicates that data X' should be used in the catalog based on data X' being the most recent entry, it may be possible that data X is used instead because the reliability rating/score of the contributor of data X may be higher than the reliability rating/score of the contributor of data X'.

As each entry is considered chronologically, if an entry indicates data which conflicts with the data in the catalog, then the reliability rating/score of the contributor newer entry may be compared to the reliability rating/score of the contributor of the current data in the catalog. If the more recent contributor's reliability rating/score is higher than the reliability rating/score of the contributor of the current data in the catalog, then the more recent data entry may replace the current data entry in the catalog. If not, then the current data entry may remain even though a newer data entry conflicts. If the reliability ratings/scores of contributors of conflicting data are the same, then the newer entry may be used, or the entry of the more reliable contributor over a given time period may be used. The time of a contributed entry may be indicated by a timestamp, so when examining more recent contributions for data conflicts, the respective timestamps of entries may be compared.

When a data conflict is identified, the reliability rating/score may not be determinative in the selection of which conflicting data entry to use in the catalog. For example, a combination of the time of a contribution and the reliability ratings/scores may be used. The older an entry, the less weight the entry may receive. Therefore, even if a contributor of an older conflicting data entry has a higher reliability rating/score than the contributor of a newer conflicting data entry, the newer data entry may replace the older data entry. A reliability rating/score may be weighted lower if the entry is older, for example.

Because the reliability rating/score of a contributor may change over time, the weight that an existing data entry in the catalog may receive may change over time. For example, if a customer complaint is received and indicates an error with a video title or subtitle, then the contributor of the relevant entry may be found, and their corresponding reliability rating/score may be adjusted. If the contributor of a data entry in the catalog becomes more reliable and has their reliability rating/score increased, then the weight of the data entry may increase or at least partially offset any decreased weight of time. The opposite also may be true, where the reliability rating/score of the contributor decreases over time, making it more likely for a newer conflicting data entry to replace the existing data entry.

The reliability rating/score may be attributed at an individual level rather than just a contributor type level. For example, individual system operators may have different reliability ratings/scores based on their error rates, as may individual content providers. This way, not every system operator or content provider may have the same score based on the type of contributor they may be.

Data errors in the catalog may be identified multiple ways. One way to detect a catalog data error is for the streaming video system to receive a customer complaint indicating the error. For example, a device associated with the system may receive user inputs indicative of a data error. If a user sees an incorrect title, synopsis, subtitle, etc., the user may submit a complaint to the system indicating the error. The system may analyze the complaint and identify the data entry corresponding to the alleged error, and may determine whether the error is valid. If so, the system may identify the contributor of the error and may adjust the reliability rating/score of the contributor. The system also may correct the error. Another way to detect a catalog data error may include a video pipeline failure. For example, if a streaming video file has corrupt bytes or is not a video file may lead to an encoding/decoding error which may prevent or disrupt playback. When such a playback/encoding error is identified from a pipeline failure, the data sent in the pipeline may be examined by the system to identify the error in the data. Another way to detect a catalog data error may include automated detection of successfully encoded video. For example, the system may detect whether subtitles are aligned with the associated audio and video or if there is a lag. Another example may include character (e.g., text) errors in subtitles or metadata, such as when foreign language characters do not render properly or are shown as incorrect characters in the metadata of the video file.

To identify the contributors of data entries for the catalog, the contributed entries may include actor metadata indicating a contributor entity. A contributor entity may use a tuple including a user name and an application identifier. The application identifier may identify a particular application such as a video streaming application used by the streaming video system. When a contributor enters a data entry including video files and associated metadata, the entry may identify a user name and an identifier associated with the video streaming application for which the data is intended. The system may identify the user name and application identifier to determine the contributor of a submitted data entry. Any contribution by a contributor may indicate the user name and application identifier. A log/file may store such information, along with the timestamp indicating when the information was received. Using a user name associated with an application identifier, the system may find historical contribution data to analyze the reliability of the contributor.

The data in the catalog may be stored in a data warehouse, and a periodic report may be generated by the streaming video system. The received data entries for the catalog may be collected and queried to identify the contributors, and the system may analyze the data. For example, the system may determine delivery success rate of individual contributors or contributor types, encoding success rate, timeliness of delivered content, customer complaints, etc. The system may use such data to determine the reliability ratings/scores of contributors. The reliability ratings/scores may be sent to one or more datastores for storage. When the system identifies data entry conflicts and resolves the conflicts based on the reliability ratings/scores, the system may call the one or more datastores and query the reliability ratings/scores. This way, the system may not have to reestablish the reliability ratings/scores of different contributors relative to one another every day, hour, etc., but rather may determine the respective reliability ratings/scores of contributors on a periodic basis, and the scores may be compared when a conflict is identified.

Contributor contribution entries may be provided through an application programming interface (API) of the streaming video system. The API may represent an interface layer between contributing systems and the streaming video system. For example, the API may allow a contributor system to input contribution data to the streaming video system. The API may allow contributing systems to generate contributions for any current or future schema without requiring code changes, and may facilitate replacing, retrieving, and soft deleting contributions. The contributed data from contributors may be modeled as schemas rather than blocks of random data, for example. A schema may be a data organization structure which specifies information about the data, such a name or data type. A schema may indicate a uniform resource locator (URL) to a video file, a frame rate attribute, encoding parameters, and other information. A system may write data using schemas, may read schemas, and identify data using schemas. The use of schemas may allow for data to be sent, received, and processed in a streaming video system. Schema best practices may facilitate schema processing by defining formats and rules for schemas. For example, a downstream system may read data from a schema and determine whether data fields are present and consistent, and whether any data fields are missing from the schema.

A contribution may include a mutable sequence of individual immutable document versions. A contribution may be indicated as deleted to undo a mistake when corrected data are not available, for example. A contribution version may be identified using a key with multiple parts, including a namespace, a contribution identifier, a partition key, and a version. A namespace may map to a single document store domain and library, and may partition a contribution identifier generation to avoid collisions. The contribution identifier may be in any desired format. The API may not manage a schema for the contribution identifier. Part providers may not parse or derive meaning from contribution identifiers. The partition key may be used to associate a contribution to a catalog entity. The version may be a string generated internally and provided to a contributing system after the contribution has been created.

Data conflicts may arise with schemas. For example, multiple attributes such as frame rate and coding rate may be coupled in a schema. A system may read a schema and identify that the frame rate is correct, but that the coding rate is incorrect. Corrected data provided by multiple contributors may conflict. For example, an operator may edit data for an attribute coupled with another attribute in a schema. The data for the other attribute may be incorrect, but the operator may be editing only the first attribute. The incorrect data then may conflict with another contributor entry.

To address schema conflicts, loose coupling (e.g., decoupling) of attributes may be implemented so that attributes may not be in the same schema. For example, while a coding rate and a frame rate may be related, it may be possible to modify one without having to modify the other. If such is true, then it may be appropriate to de-couple the coding rate and frame rate from one another. However, if two types of data are related (e.g., cohesive) such that editing one data entry may require editing the related data entry, then it may not make sense to de-couple the related data entries. De-coupling of attributes may allow attributes to be kept in separate contributions rather than couple together in a single contribution. Schema best practices used to determine the design and organization of schemas may reduce data entry conflicts, and the contributor reliability ratings/scores may be used to resolve conflicts when conflicts occur.

The scalability of data entry conflicts may present a challenge when many contributions are provided to the streaming video system, and the uses of schemas combined with the contributor reliability ratings/scores may address the challenge. For example, to avoid conflicts, every single attribute/key-value pair may be a separate contribution (e.g., individual schemas for each attribute). However, when using a large number of entries, the number of schemas may increase. If a video used fifty audio languages and fifty subtitle languages, and each file for each language included five attributes, such would require five hundred contribution documents. When many video files are associated with many files, then using individual files may require a larger number of files than when some attributes are coupled, and may require more time to process the large number of files. Thus, coupling of attributes may result in some data conflicts, but the contributor reliability ratings/scores may address data conflicts.

The streaming video system may launch an input API as a service allowing a contributor to input data. The streaming video system may look up a domain and library for a namespace and schema from a schema routing configuration table. The streaming video system may persist (e.g., outlive) a contribution to a document store using a partner entity identifier as an external identifier and a namespace+contribution identifier as a document identifier. If a document already exists at the same location but with a different payload, an error may be returned. If the document exists with the same payload, a success indication may be returned. If the contribution was previously deleted, an error may be returned.

To replace a contribution for a partner entity, streaming video system may persist the new payload to the document store with a write constraint using a previous version string. If the write is successful, a success indication may be returned. If a document already exists with a given version and the same payload, a success indication may be returned. If a document is marked as deleted, the document may be un-deleted, and the streaming video system may create a new version with the given payload, and may return a success indication.

To delete a contribution for a partner entity, the streaming video system may delete a contribution with a given identifier and version from a document store. If successful or if the contribution has been deleted, a success indication may be returned. If a contribution identifier exists and is not deleted and the version is not the latest version, an error indication may be returned.

To "get" a contribution summary for a partner entity, the streaming video system may retrieve a contribution document from a document store. If a document version is null, the latest contribution may be returned. To get contribution history for a partner entity, the streaming video system may use the operation to get a contribution summary, but the history also may be returned for the contributor. To get a contribution payload for a partner entity, the get contribution summary operation may be used, but the payload also may be returned for the contributor. To get active contributions for a partner entity, the streaming video system may query a document store for any active contributions under a partner entity identifier.

Contributions and parts (CAP) for the streaming video system may represent a framework of patterns reusable components which may simplify development and maintenance efforts in a part provider workflow. CAP components may include services like a document store, an entity manager, feedback service, and schemata. Some elements of the CAP may include a CAP input API, a listener, a part creation graph concept, a common activities service integration layer, and a developer tools website. The CAP input API may allow upstream contributing systems to create and inspect contributions. The API may facilitate PUT, GET, and DELETE operations as described above with regard to partner entities, for example. The listener may include a polling component which continues a workflow after a contribution has been ingested. The listener may identify when new contributions are made. The part creation graph concept may use a graph to perform collect, select, build, and publish stages of an end-to-end part provider workflow using the common activities service integration layer. The common activities service integration layer may be domain-agnostic and may provide common functionality to any part creation workflows. The common activities service integration layer may provide activities to collect contributions for a target entity, persist intermediate documents, call a feedback service, and publish parts. The developer tools website may provide operational tools for engineers to view and manage contribution objects and workflows.

The listener may identify that a data entry in the catalog has changed. For example, the listener may listen to an entity manager, which manages catalog data. The entity manager may manage separate nodes for the Seinfeld television show, Seinfeld season 1, and Seinfeld season 1, episode 1. Each node may be associated with an entity identifier. When a change is made to a node with an entity identifier, the listener may receive the reconciled entity or reconciled partner entity associated with a partner entity from the entity manager, and may identify the node where an entry has changed. The listener may also receive indications from a document store service which stores data provided by a contributor through an input API. The listener may receive an indication from the document store service indicating a data change. The listener may call a workflow platform API and request a workflow corresponding to an entity and/or contribution as identified by the data received from the document store service and/or the entity manager. If a contribution is indicative of a video file frame rate, then the schema/contribution type may map to a particular workflow. Using a workflow graph, the contribution and any other contributions associated with an entity and relevant to the workflow (e.g., a schema associated with video frame rate) may be reprocessed. The workflow may collect the relevant contributions and select the contributions to use when data conflicts exist (e.g., using contributor reliability scoring/rating). The selected contributions may be used in the catalog.

The examples described herein are not limited to video systems. Other software systems which receive contributions from different parties in other software contexts may apply. For example, conflicting entries for software applications unrelated to video may be resolved using contributor trust as described herein.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 of determining video data using contributor trust, in accordance with one or more example embodiments of the present disclosure.

Referring to FIG. 1, the process 100 may include multiple contributing parties such as contributor 102 and contributor 104. The contributor 102 and the contributor 104 may refer to computer devices used to send video data in the form of contributions to a cloud server 106 where the video data may be organized and stored for use in streaming video systems. The cloud server 106 may receive video data contributions and use them in a catalog which may be used to present video data to a user and to facilitate the streaming and playback of video content. The cloud server 106 may receive two data entries indicative of the same video content (e.g., TV Show 1, season 1, episode 1). The data entries for the video content may not match, however. For example, the date of the program may have been incorrectly entered by either the contributor 102 or the contributor 104. To determine which contributor's data entry is the correct one (e.g., which data entry reflects the correct date), the cloud server 106 may, at step 108, determine that a reliability score of contributor 102 is greater than a reliability score of contributor 104 regardless of the respective times when the contributors' conflicting data was received. At step 110, at least because the reliability score of the contributor 102 is greater than the reliability score of the contributor 104, the cloud server 106 may use the contribution (e.g., the data) submitted by the contributor 102 for the catalog. The cloud server 106 may publish the data contributed by the contributor 102 to the catalog, which may be stored in a video catalog storage 112 on the cloud server 106. The cloud server 106 may provide data from the catalog to a user computer 113 for display (e.g., to a user 114). For example, when a user activates a video streaming service/application on the user computer 113, the data presented may include data from the catalog, such as information about selectable content.

The contributor 102 and the contributor 104 may include any party who submits video data to the cloud server 106. For example, contributors may include providers of playable video content and associated metadata, providers of audio content, providers of subtitles, providers of legal information associated with playable content, providers of video encoding information, system operators, quality assurance personnel, and others. In one example, the data entry submitted by the contributor 104 may be received before the data entry submitted by the contributor 102. The contributor 104 may be a content provider, while the contributor 102 may be a system operator who sees data (e.g., the year) incorrectly submitted by the contributor 104. The contributor 102 may submit replacement data to correct the incorrectly submitted data by contributor 104. Rather than assuming that the newest entry is accurate, the cloud server 106 may consider which contributor is more reliable. If the contributor 102 has a higher reliability score than the contributor 104 based on preset and/or historical data, for example, the cloud server 106 may use the data provided by the contributor 102 for the catalog. In another example, the data submitted by the contributor 104 may be received by the cloud server 106 after the data submitted by the contributor 102. However, it may be possible that the earlier submitted data by the contributor 104 represents the correct data, so rather than automatically writing the most recent data to the catalog, the cloud server 106 may consider the reliability rankings of the contributors in determining which conflicting data entry to publish.

Data entries submitted by contributors may be in the form of a contribution (e.g., a mutable sequence of individual immutable document versions). A contribution may be identified by identifiers which indicate the contribution, where the contribution may be stored, a catalog entity associated with the contribution, a version, and other information. Data entries may include time indications such as timestamps to identify when contributions were received. To identify the contributors of data entries for the catalog, the contributed entries may include actor metadata indicating a contributor entity. A contributor entity may use a tuple including a user name and an application identifier. The application identifier may identify a particular application such as a video streaming application used by the streaming video system. When a contributor enters a data entry including video files and associated metadata, the entry may identify a user name and an identifier associated with the video streaming application for which the data are intended. The system may identify the user name and application identifier to determine the contributor of a submitted data entry. Any contribution by a contributor may indicate the user name and application identifier. A log/file may store such information, along with the timestamp indicating when the information was received. Using a user name associated with an application identifier, the system may find historical contribution data to analyze the reliability of the contributor.

Figure 2:
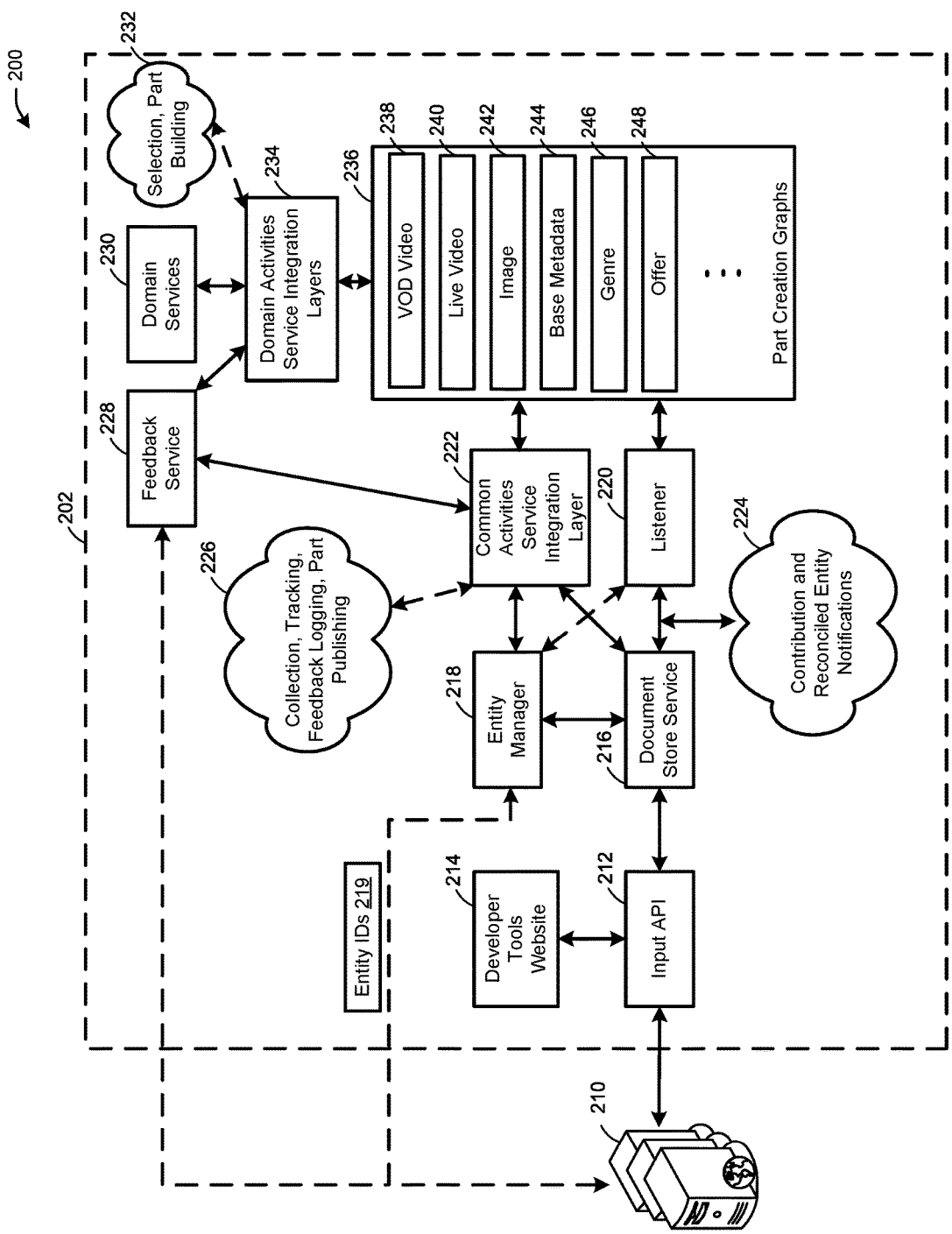
FIG. 2 illustrates an example system for determining video data using contributor trust, in accordance with one or more example embodiments of the present disclosure.

FIG. 2 illustrates an example system 200 for determining video data using contributor trust, in accordance with one or more example embodiments of the present disclosure.

Referring to FIG. 2, the system 200 may include a streaming video system 202 which may receive video data from one or more contributing systems 210. The streaming video system 202 may include/provide components and services such as an input API 212, a developer tools website 214, a document store service 216, an entity manager 218, a listener 220, a common activities service integration layer 222, a contribution and reconciled entity notifications provider 224, a collection, tracking, feedback logging, and part publishing service 226, a feedback service 228, a domain service 230, a selection and part building service 232, a domain activities service integration layer 234, and part creation graphs 236, which may include video on demand (VOD) video graphs 238, live video graphs 240, image graphs 242, base metadata graphs 244 (e.g., video metadata), genre graphs 246, offer graphs 248, and other graphs.

The streaming video system 202 may provide the input API 212, which may be accessed by the one or more contributing systems 210, which may represent user proxies to input data. The one or more contributing systems 210 may include servers or other computer systems through which other devices may provide contributions to the streaming video system 202. The input API 212 may represent an asynchronous mechanism through which contributions to the streaming video system 202 may be made. The input API 212 may facilitate the verification of user permissions to contribute data. The input API 212, the entity manager 218, and the feedback service 228 may represent an interface layer between the one or more contributing systems 210 and the streaming video system 202. The input API 212 may enable the one or more contributing systems 210 to create contributions for any current or future schema without code changes, and may provide operations for replacing, retrieving, and soft deleting contributions. The one or more contributing systems 210 may exchange entity identifiers 219 with the entity manager 218. The one or more contributing systems 210 may communicate with the feedback service 228 to receive feedback regarding whether to generate a ticket or an email, for example.

A contribution may be a mutable sequence of individual immutable document versions. A contribution may be marked as deleted to undo a mistake when corrected data are not available. A contribution version may be uniquely identified by a four-part composite key including the following: (1) A Namespace that maps to a single document store domain and library (e.g., in the document store service 216), and partitions a contribution identifier generation to avoid collisions. (2) A Contribution identifier in any desired format. The input API 212 may not manage a schema for this identifier. Part providers may not parse or derive meaning from contribution identifiers so as to avoid tight coupling with a contributing system. (3) A Partition Key (e.g. a partition entity identifier (PEID) or pair of PEIDs) to associate the contribution to a catalog entity. (4) A Version string, generated internally and provided to a contributing system after creation.

A composite key may provide uniqueness for a contribution with the same identifier from different contributing systems, contributors using the same contributing system, or for different PEIDs. The one or more contributing systems 210 may use business data to deterministically generate key values without any state persistence. A content rights contribution (e.g., legal rights), for example, may have a contribution ID represented by the territory and business line (e.g. "Germany:TV On-Demand"). An asset contribution may use the filename or checksum in the contribution ID. Such may allow the one or more contributing systems 210 to easily provide replacement data in the future.

The input API 212 may use a configuration table to determine the document store service 216 domain and library with which to store contributions. The configuration may hide data storage concerns from the one or more contributing systems 210 because the document store service 216 may have multiple libraries which use the same schema, and only one may be used as the "active" contribution store for a namespace and schema. The configuration table may be maintained with a command line interface (CLI) tool made available to the one or more contributing systems 210 and part providers, and may ensure that a document store service 216 library is only included once. Any entry in the configuration table may be immutable.

Read, write, replace, and delete access control may be provided by the input API 212 for schemas and individual documents. The input API 212 may enforce authentication and authorization using identities of the one or more contributing systems 210 (e.g., authentication, authorization, and accounting identifiers). The input API 212 may allow more granular authorization for individual contributor names, but may rely on the one or more contributing systems 210 for contributor authentication.

Contributor operations may include a requestor identity parameter, which may include an implicit and required authentication, authorization, and accounting (AAA) identity of the contributing system (e.g., the one or more contributing systems 210), and an optional requestor name. The one or more contributing systems 210 may provide the name in any format they desire (e.g. "HBO", "dv-content-ops", or a random universal unique identifier). The name may be used to perform the granular access checks.

The input API 212 may launch as a service with the operations described below. Operations may validate the input parameters, which may include syntactic validation of a payload against its respective schema. Some example operations include creating a partner contribution for a partner entity, replacing a contribution for a partner entity, deleting a contribution for a partner entity, "getting" a contribution for a partner entity, "getting" a contribution payload for a partner entity, and "getting" active contributions for a partner entity.

The Part creation graphs 236 may coordinate collect, select, build, and publish stages of a part provider workflow. Any part provider may create and manage an account and graphs. The streaming video system 202 may provide the common activities service integration layer 222. Graphs may publish territory-specific parts using child graphs and work items. Part providers A basic graph flow may include the following.

Activities in a collect stage may be provided by the streaming video system 202 and may not require any domain-specific code. The activities first may read the territories and versions of currently-published parts under a target entity, which may result in acquiring an optimistic write lock on the target entity. Next, an activity may query the entity manager 218 for all PEIDs under the target entity. An activity may perform a strongly-consistent read of all active contributions for the PEIDs. The activity may read any libraries included in inputs to the work item. The output of the collect stage may include a list of all "collected" contributions partitioned by territory, for example. The remainder of a graph may be executed in context of a specific territory (or a "GLOBAL" default territory). The collect stage may be facilitated by the collection, tracking, feedback logging, and part publishing service 226.

Activities in the select and build stages may be closely related and domain-specific. Select and build stages may be facilitated by the selection and part building service 232. Any part provider semantic validation may be included in these two stages. Select activities may reduce the set of collected contributions and resolve conflicts. After selection, the build activities may create a part document from the final set of selected contributions. If there are any ambiguities in the contributions, the build may fail and provide issues to the feedback service 228.

The publish stage may be responsible for updating a part store. Any territory child workflow may use a version acquired during the collect stage, along with a part from the build stage, and may publish the new part. If no part was created, no further action may be taken. If the target entity is an alias or deprecated, or if a particular territory no longer has any active contributions, the current part may be deleted.

The common activities service integration layers 222 may provide domain-agnostic workflow handlers. The streaming video system 202 may expose configurable callbacks for domain-specific code, and may define logic in domain-specific activity service integration layers. The common workflow handlers may include the following. "GetExistingParts" may be the first activity in the collect stage. This activity may retrieve a version string and territory of the parts currently published to a reconciled partner entity identifier. "GetTargetEntityStatus" may query the entity manager 218 for the status of the entity, such as "primary", "alias", or "deprecated." The status may be used to branch the graph for appropriate part publishing or unpublishing. "GetPEIDsByRE" and "GetPEIDsByRPE" may query a reconciled entity document for any partner entities associated with a reconciled entity. "GetContributionRefsByPEIDs" may return a set of contribution identifiers for all the partner entities discovered by the earlier activities. This may involve multiple strongly-consistent calls to the document store service 216, and may return the latest version of every non-deleted contribution. "SpawnTerritoryWorkItems" may partition contribution references by territory, open child work items for each territory, and open work items for territories for which have published parts, even if there are no active contributions. "PublishPart" may write a part to the document store service 216. If no part existed when "GetExistingParts" was called, the write may be performed with a CREATE_ONLY flag. If a part did exist, an "expectedLatestVersion" value will be included in the request. "UnpublishPart" may delete a part from the document store service 216, and may be used in graphs when the target entity status includes "alias" or "deprecated," or for territories where there is a part but no longer any active contributions.

Some activities in the part creation graphs will be domain-specific and facilitated by the domain activities service integration layers 234. Some of these activities may be included in the select and build stages, but activities in any stage may be replaced with domain-specific variants. Any part provider may be responsible for maintaining one or more service integration layer services to host activities. The service integration layers may provide workflow handlers for copying image files, encoding video content, running validation checks, calling the feedback service 228, and anything else that the part provider may need. For example, the image graphs 242 may include custom workflow handlers for validating an image file and copying the file from source storage to a MediaCentral-backed bucket. An ImagePart may be created with a list of all the valid images. The domain activity service integration layers 234 may encapsulate calls to any service that is needed to help build parts. Workflows may not rely on these services to provide non-derived input data. One example may include playback services for video encoding.

Part creation work items (e.g., workflows) may be facilitated by the listener 220 (e.g., a component). The listener 220 may be subscribed to the event queues for any active contribution libraries and reconciled entity libraries. The listener 220 may include a set of "pollers" in a service. The listener 220 may listen for new contributions from the one or more contributing systems 210 and may identify identifiers of entities provided by the entity manager 218. For example, each video program may be associated with a node having an identifier, and the entity manager 218 may manage entity relationships. By subscribing to event queues, the listener 220 may identify partner entity identifiers associated with contributions managed by the entity manager 218. The listener 220 may request creation of one or more workflows/graphs from the part creation graphs 236. The workflows/graphs may be created based on the type of contribution, such as on-demand video (e.g., VOD video graphs 238), live video (live video graphs 240), image data (e.g., image graphs 242), base metadata (e.g., base metadata graphs 244), genre data (e.g., genre graphs 246), or other data. For example, if a contribution is identified as being associated with on-demand video, then a request for VOD video graphs 238 may be submitted, and workflows indicating data entries from VOD contributions may be returned. If a new contribution conflicts with data in the returned workflow/graphs, then the contributor's identifier may be used to identify the contributor's reliability ranking, and the data used to publish to the catalog may be determined based on the reliability rankings of contributors.

When the listener 220 receives a notification about a contribution creation, update, or deletion, the listener 220 may create a work item. The parameters for work item creation may include a client ID, a graph name, a list of the document store service 216 libraries for the workflow to query during the collect stage, and the work item scope. The listener 220 also may call the entity manager 218 to receive an entity identifier for the contribution, and may send the values as inputs to the new work item. If anything in this process fails, a metric may be logged indicating the library and graph that failed to enable a part provider to configure alarms. When a notification is received about a reconciled entity document, the listener 220 may start new work items for any unique graph (e.g., part creation graphs 236). The listener 220 may use any graph's the dynamic configuration to determine if a single work item should be created for an entity or if a work item should be created for each entity.

Part providers may use the streaming video system 202 as follows. Part providers may create contribution and part schemas and register them. Part providers may create domains and libraries in the document store service 216. Part providers may register schema. Part providers may grant read and write access to the domains and libraries. Part providers may build a part provider-specific service integration layer or expose a workflow endpoint in an existing service. Part providers may onboard write part creation graphs. Part providers may use an input router for generating the contribution storage location and performing basic semantic validation. Part providers may use a contribution listener router for obtaining parameters for starting a new work item. Part providers may use a reconciled entity listener router for obtaining the parameters for starting a new work item. Part providers may work with contributing systems to onboard to the input API 212. The one or more contributing systems 210 may be responsible for their own payload serialization, and may call the entity manager 218 directly.

Figure 3:
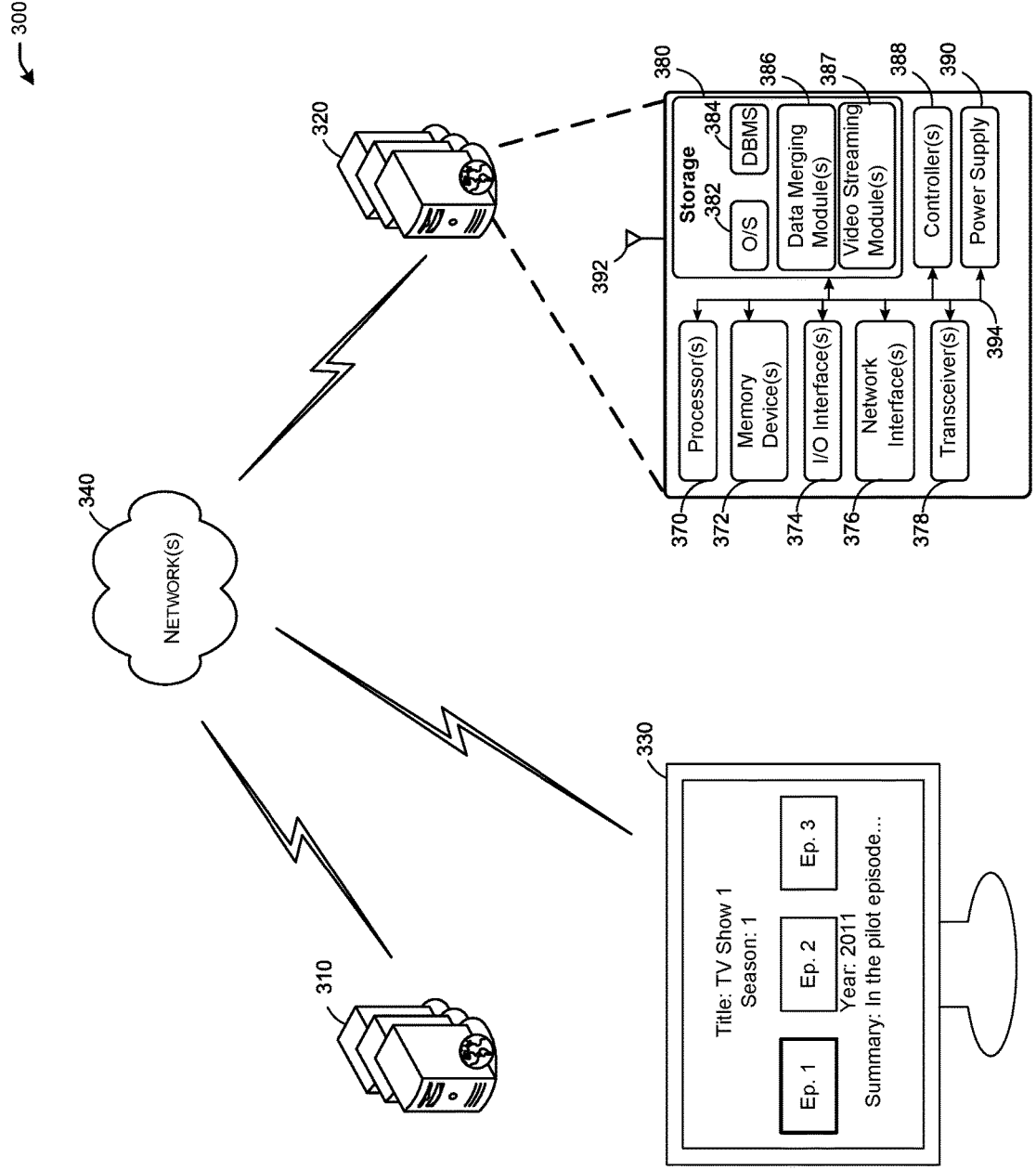
FIG. 3 depicts an example system for determining video data using contributor trust, in accordance with one or more example embodiments of the present disclosure.

FIG. 3 depicts a system 300 for determining video data using contributor trust, in accordance with one or more example embodiments of the present disclosure.

Referring to FIG. 3, the system 300 may include one or more contributing systems 310, one or more video streaming servers 320 (e.g., hosting the streaming video system 202 of FIG. 2), and a user display 330. The one or more contributing systems 310 may include servers or computer systems which may provide video data to the one or more video streaming servers 320 over one or more networks 340, as described above in FIG. 2, and the one or more video streaming servers 320 may provide the video data to the user display 330 over the one or more networks 340.

Still referring to FIG. 3, the so one or more video streaming servers 320 may include one or more components. For example one or more video streaming servers 320 may include processing circuitry 370, one or more memory devices 372, one or more input/output interfaces 374, one or more network interfaces 376, one or more transceivers 378, storage 380 (e.g., which may store one or more operating systems 382, one or more database management systems 384, one or more data merging modules 386, and one or more video streaming modules 387), one or more controller 388, a power supply 390, one or more anntena(e) 392, and one or more bus(es) 394.

Referring to the components of the one or more video streaming servers 320, the storage 380 may include removable storage and/or non-removable storage including, but not limited to, magnetic storage, optical disk storage, and/or tape storage. The storage 380 may provide non-volatile storage of computer-executable instructions and other data. The storage 380, removable and/or non-removable, are an example of computer-readable storage media (CRSM) as that term is used herein.

The storage 380 may store computer-executable code, instructions, or the like that may be executable by the processing circuitry 370 to cause the processing circuitry 370 to perform or initiate various operations (e.g., operations associated with computer-executable instructions for the one or more data merging modules 386 and the one or more video streaming modules 387). The storage 380 may additionally store data that may be copied for use by the processing circuitry 370 during the execution of the computer-executable instructions. Moreover, output data generated as a result of execution of the computer-executable instructions by the processing circuitry 370 may be copied to the storage 380 for non-volatile storage.

The storage 380 may store one or more program module(s), applications, engines, computer-executable code, scripts, or the like. Some or all of these module(s) may be or include sub-module(s). Any of the components depicted as being stored in the storage 380 may include any combination of software, firmware, and/or hardware. The software and/or firmware may include computer-executable code, instructions, or the like that may executed by one or more of the processing circuitry 370. Any of the components depicted as being stored in the storage 380 may support the functionality described in reference to the corresponding components named earlier in this disclosure.

The storage 380 may further store various types of data utilized by the components of the one or more video streaming servers 320. Any data stored in the storage 382 may be used by the processing circuitry 370 in executing computer-executable code. In addition, any data depicted as being stored in the storage 380 may potentially be stored in one or more datastore(s). The datastore(s) may include, but are not limited to, databases (e.g., relational, object-oriented, etc.), file systems, flat files, distributed datastores in which data are stored on more than one node of a computer network, peer-to-peer network datastores, or the like.

The storage 380 may store the one or more data merging modules 386. The one or more data merging modules 386 may provide executable code for providing a user interface, receiving contributor inputs, resolving conflicting data, publishing the catalog, etc. The one or more video streaming modules 387 may provide executable code for providing streaming video to the user display 330.

The processing circuitry 370 may be configured to access the storage 380 and execute the computer-executable instructions loaded therein. For example, the processing circuitry 370 may be configured to execute computer-executable instructions of the various program module(s), applications, engines, or the like of the one or more video streaming servers 320 to cause or facilitate various operations to be performed in accordance with one or more embodiments of the disclosure. The processing circuitry 370 may include any suitable processing unit capable of accepting data as input, processing the input data in accordance with stored computer-executable instructions, and generating output data. The processing circuitry 370 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an Image Signal Processor (ISP), a digital signal processor (DSP), and so forth. Further, the processing circuitry 370 may have any suitable microarchitecture design that includes any number of constituent components such as, for example, registers, multiplexers, arithmetic logic units, cache controllers for controlling read/write operations to cache memory, branch predictors, or the like. The microarchitecture design of the processing circuitry 370 may be capable of supporting any of a variety of instruction sets.

The one or more video streaming servers 320 may further include one or more network interface(s) 376 via which the one or more video streaming servers 320 may communicate with any of a variety of other systems, platforms, networks, devices, and so forth. The network interface(s) 376 may enable communication, for example, with one or more wireless routers, one or more host servers, one or more web servers, and the like via one or more networks. The network interface(s) 376 may enable communication, for example, with one or more wireless routers, one or more host servers, one or more web servers, and the like via one or more networks.

The transceivers 378 may include any suitable type of transceiver depending, for example, on the communications protocols used to transmit or receive signals. The transceivers 378 may additionally, or alternatively, include a Wi-Fi transceiver configured to transmit or receive signals in accordance with established standards and protocols. The transceivers 378 may include any suitable radio component(s) for transmitting or receiving signals in a bandwidth and/or channels. The transceivers 378 may include any known receiver and baseband suitable for communicating via the communications protocols utilized by the one or more video streaming servers 320. The transceivers 378 may further include a low noise amplifier (LNA), additional power signal amplifiers (PA), an analog-to-digital (A/D) converter, one or more buffers, a digital baseband, or the like.

It should be appreciated that the program module(s), applications, computer-executable instructions, code, or the like depicted in FIG. 3 as being stored in the storage 380 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the one or more video streaming servers 320, and/or hosted on other computing device(s) accessible via one or more networks, may be provided to support the functionality provided by the program module(s), applications, or computer-executable code depicted in FIG. 3 and/or additional or alternate functionality. Further, functionality may be modularized differently such that processing described as being supported collectively by the collection of program module(s) depicted in FIG. 3 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 3 may be implemented, at least partially, in hardware and/or firmware across any number of devices.

It should further be appreciated that the one or more video streaming servers 320 may include alternate and/or additional hardware, software, or firmware components beyond those described or depicted without departing from the scope of the disclosure. More particularly, it should be appreciated that software, firmware, or hardware components depicted as forming part of the one or more video streaming servers 320 are merely illustrative and that some components may not be present or additional components may be provided in various embodiments. While various illustrative program module(s) have been depicted and described as software module(s) stored in the storage 380, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

The one or more video streaming servers 320 may further include one or more buses 394 that functionally couple various components of the one or more video streaming servers 320. The bus(es) 394 may include at least one of a system bus, a memory bus, an address bus, or a message bus, and may permit the exchange of information (e.g., data (including computer-executable code), signaling, etc.) between various components of the one or more video streaming servers 320. The bus(es) 394 may include, without limitation, a memory bus or a memory controller, a peripheral bus, an accelerated graphics port, and so forth. The bus(es) 394 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The bus(es) 394 may include at least one of a system bus, a memory bus, an address bus, or a message bus, and may permit the exchange of information (e.g., data (including computer-executable code), signaling, etc.) between various components of the one or more video streaming servers 320. The bus(es) 394 may include, without limitation, a memory bus or a memory controller, a peripheral bus, an accelerated graphics port, and so forth. The bus(es) 394 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 372 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 372 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 372 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

More specifically, the storage 380 may store one or more operating systems (O/S) 382; one or more database management systems (DBMS) 354; and one or more program module(s), applications, engines, computer-executable code, scripts, or the like such as, for example, the one or more data merging module(s) 386 and the one or more video streaming modules 387. Some or all of these module(s) may be or include sub-module(s). Any of the components depicted as being stored in the storage 380 may include any combination of software, firmware, and/or hardware. The software and/or firmware may include computer-executable code, instructions, or the like that may be loaded into the memory 372 for execution by processing circuitry 370. Any of the components depicted as being stored in the storage 380 may support the functionality described in reference to the corresponding components named earlier in this disclosure.

The storage 380 may further store various types of data utilized by the components of the one or more video streaming servers 320. Any data stored in the storage 380 may be loaded into the memory 372 for use by the processing circuitry 370 in executing computer-executable code. In addition, any data depicted as being stored in the storage 380 may potentially be stored in one or more datastore(s) and may be accessed via the DBMS 384 and loaded in the memory 372 for use by the processing circuitry 370 in executing computer-executable code.

Referring now to other illustrative components depicted as being stored in the storage 380, the O/S 382 may be loaded from the data storage 380 into the memory 372 and may provide an interface between other application software executing on the one or more video streaming servers 320. More specifically, the O/S 382 may include a set of computer-executable instructions for managing the hardware resources of the one or more video streaming servers 320 and for providing common services to other application programs (e.g., managing memory allocation among various application programs). In certain example embodiments, the O/S 382 may control execution of the other program module(s) to dynamically enhance characters for content rendering.

The DBMS 384 may be loaded into the memory 372 and may support functionality for accessing, retrieving, storing, and/or manipulating data stored in the memory 372 and/or data stored in the storage 380. The DBMS 384 may use any of a variety of database models (e.g., relational model, object model, etc.) and may support any of a variety of query languages. The DBMS 384 may access data represented in one or more data schemas and stored in any suitable data repository including, but not limited to, databases (e.g., relational, object-oriented, etc.), file systems, flat files, distributed datastores in which data are stored on more than one node of a computer network, peer-to-peer network datastores, or the like.

Referring now to other illustrative components of the one or more video streaming servers 320, the input/output (I/O) interface(s) 374 may facilitate the receipt of input information by the one or more video streaming servers 320 from one or more I/O devices as well as the output of information from the one or more video streaming servers 320 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the one or more video streaming servers 320 or may be separate. The I/O devices may further include, for example, any number of peripheral devices such as data storage devices, printing devices, and so forth. The I/O interface(s) 374 may also include an interface for an external peripheral device connection such as HDMI, universal serial bus (USB), micro-USB, FireWire, Thunderbolt, Ethernet port or other connection protocol that may connect to one or more networks.

The controller(s) 388 may be any microcontroller or microprocessor configured to control one or more operations of the one or more video streaming servers 320. The power supply 390 may be a battery, such as a lithium-ion battery. The power supply 390 may be provided power from a power receptacle or other power charging device.

The one or more video streaming servers 320 may optionally include one or more antenna(e) 392 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, an RFID antenna, and so forth.

Figure 4:
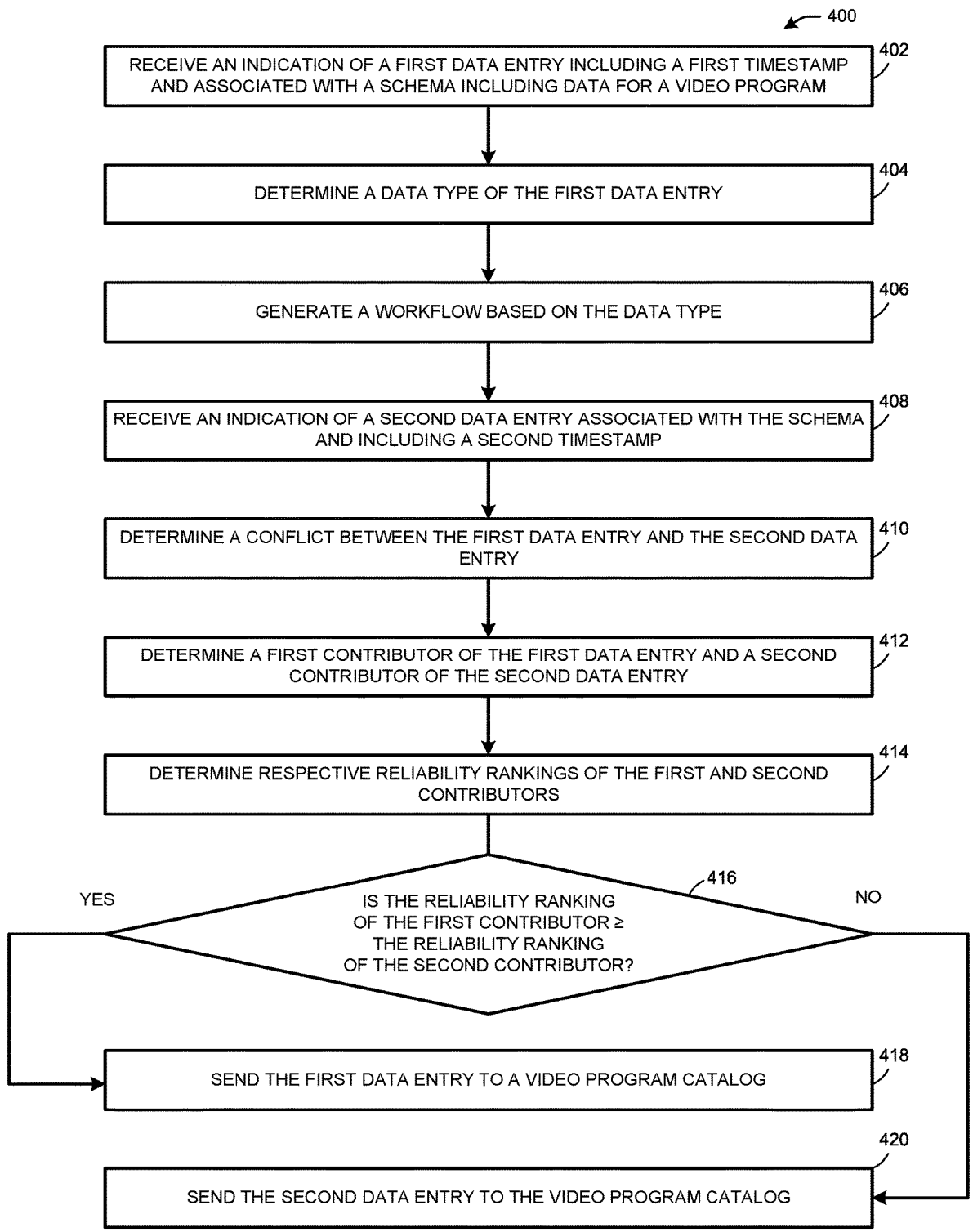
FIG. 4 illustrates a flow diagram for a process for determining video data using contributor trust, in accordance with one or more example embodiments of the present disclosure.

FIG. 4 illustrates a flow diagram for a process 400 for determining video data using contributor trust, in accordance with one or more example embodiments of the present disclosure.

At block 402, processing circuitry of a device, (e.g., streaming video system 202 of FIG. 2) may receive an indication of a first data entry (e.g., provided by the one or more contributing systems 210 through the input API of FIG. 2). The indication of the data entry may include a first timestamp, and the data entry may be associated with a schema including data for a video program documented by a video catalog. For example, the listener 220 of FIG. 2 may identify an identifier associated with a data entry by listening to the entity manager 218 of FIG. 2. Based on the type of data entry (e.g., bibliographic data, video coding data, legal data, artwork, etc.), a schema may be associated with the entry, and any contributed data of a similar type may be associated with the schema.

At block 404, the processing circuitry of the device may determine a data type of the first data entry. Using one or more identifiers, the contributor and data type of a data entry may be identified. Based on the type of data, a workflow with data entries of the same type may be identified and returned. For example, the type of data may include bibliographic data, video coding data, legal data, artwork, performer data (e.g., actors/actresses, director, producer) etc.

At block 406, the processing circuitry of the device may generate a workflow/work item based on the data type. For example, if the data are for VOD data, then the VOD video graphs 238 of FIG. 2 may be generated. When the listener 220 of FIG. 2 receives a notification about a contribution creation, update, or deletion, the listener 220 may create a work item. The parameters for work item creation may include a client ID, a graph name, a list of the document store service 216 libraries of FIG. 2 for the workflow to query during the collect stage, and the work item scope. The listener 220 also may call the entity manager 218 of FIG. 2 to receive an entity identifier for the contribution, and may send the values as inputs to the new work item. If anything in this process fails, a metric may be logged indicating the library and graph that failed to enable a part provider to configure alarms. When a notification is received about a reconciled entity document, the listener 220 may start new work items for any unique graph. The listener 220 may use any graph's the dynamic configuration to determine if a single work item should be created for an entity or if a work item should be created for each entity.

At block 408, the processing circuitry of the device may receive one or more indications of additional data entries associated with the schema of the first data entry. Any data entries of a schema may be called. For example, multiple data entries of different types may be coupled in a schema. Coding and frame rates, for example, may be similar enough to group in a schema. This way, an entry for a coding rate may include an entry for a frame rate. The device may read a schema and identify that the frame rate is correct, but that the coding rate is incorrect. Corrected data provided by multiple contributors may conflict. For example, an operator may edit data for an attribute coupled with another attribute in a schema. The data for the other attribute may be incorrect, but the operator may be editing only the first attribute. The incorrect data then may conflict with another contributor entry. To address schema conflicts, loose coupling (e.g., de-coupling) of attributes may be implemented so that attributes may not be in the same schema. For example, while a coding rate and a frame rate may be related, it may be possible to modify one without having to modify the other. If such is true, then it may be appropriate to de-couple the coding rate and frame rate from one another. However, if two types of data are related (e.g., cohesive) such that editing one data entry may require editing the related data entry, then it may not make sense to de-couple the related data entries. De-coupling of attributes may allow attributes to be kept in separate contributions rather than couple together in a single contribution. Schema best practices used to determine the design and organization of schemas may reduce data entry conflicts, and the contributor reliability ratings/scores may be used to resolve conflicts when conflicts occur. When data is entered, a workflow may be generated. A workflow may be generated for any part creation graph (e.g., the part creation graphs 236 of FIG. 2). When a contribution creation, update, or deletion is detected (e.g., by listener 220 of FIG. 2), a workflow may be generated.

At block 410, the processing circuitry of the device may determine a conflict between the first data entry and a second data entry of the additional data entries retrieved based on the schema associated with the first data entry. Thus, workflows associated with the schema may be used to identify a conflict between data entries. The conflict may be identified automatically by identifying data entries from different contributors which do not match, by receiving customer complaints indicating the type of data which may have caused an error (e.g., a typo in a video title presented to a user because the incorrect title was published to the catalog), or by identifying an encoding error (e.g., video provided by the device is not downloaded or played properly, so a pipeline error may be recognized). A schema with coupled data entries may have errors for one type of data, but not another in a couple. For example, if the video coding rate and bit rate are coupled, a contributor may enter a coding rate for a video program which may be correct, but the existing bit rate may not be correct. If the incorrect bit rate is identified as conflicting with a data entry received earlier or later, then a conflict may be identified. An operator may identify errors and correct them, but if a contributor entered the wrong data, an operator corrects the data, and the contributor inputs another data entry with the wrong data again, then conflicting entries may be identified. Rather than automatically accepting the latest data entry, which may not be correct and which may conflict with existing data used for the catalog, contributor reliability rankings may be used to determine which data to publish to the catalog when there are data conflicts.

At block 412, the processing circuitry of the device may determine the first contributor of the first data entry. At block 414, the processing circuitry may determine the second contributor of the second conflicting data entry. Identifiers of contributors may be included in data entries. A contributor entity may use a tuple including a user name and an application identifier. The application identifier may identify a particular application such as a video streaming application used by the streaming video system. When a contributor enters a data entry including video files and associated metadata, the entry may identify a user name and an identifier associated with the video streaming application for which the data is intended. The device may identify the user name and application identifier to determine the contributor of a submitted data entry. Any contribution by a contributor may indicate the user name and application identifier. A log/file may store such information, along with the timestamp indicating when the information was received. Using a user name associated with an application identifier, the device may find historical contribution data to analyze the reliability of the contributor.

At block 416, the processing circuitry of the device may determine whether the reliability ranking of one contributor is higher than the reliability ranking of the other contributor. The contributors may have reliability rankings stored based on their historical error rates, preset rankings, contributor types, individual contributor records, etc. Identifiers of contributors may be mapped to contributor reliability rankings and compared to determine which contributor's data to use when data conflicts arise. Rankings may be adjusted based on contributor performance. If a conflict resolution indicates that one contributor's data was in error, the respective ranking may be decreased and/or the respective ranking of the correct contributor may be increased. Weighted rankings may be used to account for other factors such as time. An older time entry may receive less weight than a newer entry, so even if a reliability ranking of one contributor is higher than a reliability ranking of another contributor, it may be possible to use a data entry of a less reliable contributor. If the reliability ranking of the first contributor is higher, then the process 400 may continue to block 418 where the device may select and publish the first data entry to the catalog. Otherwise, if the reliability ranking of the second contributor is higher, then the process 400 may continue to block 420 where the second data entry may be selected and published to the catalog. In the event of ranking tie, the most recent or an existing data entry may be selected. Some data in the catalog may be provided to a user display to indicate available video content and relative details, and some data in the catalog may be used to determine how to stream and play video (e.g., coding rate, compression type, bit rate, video resolution, etc.).

Figure 5:
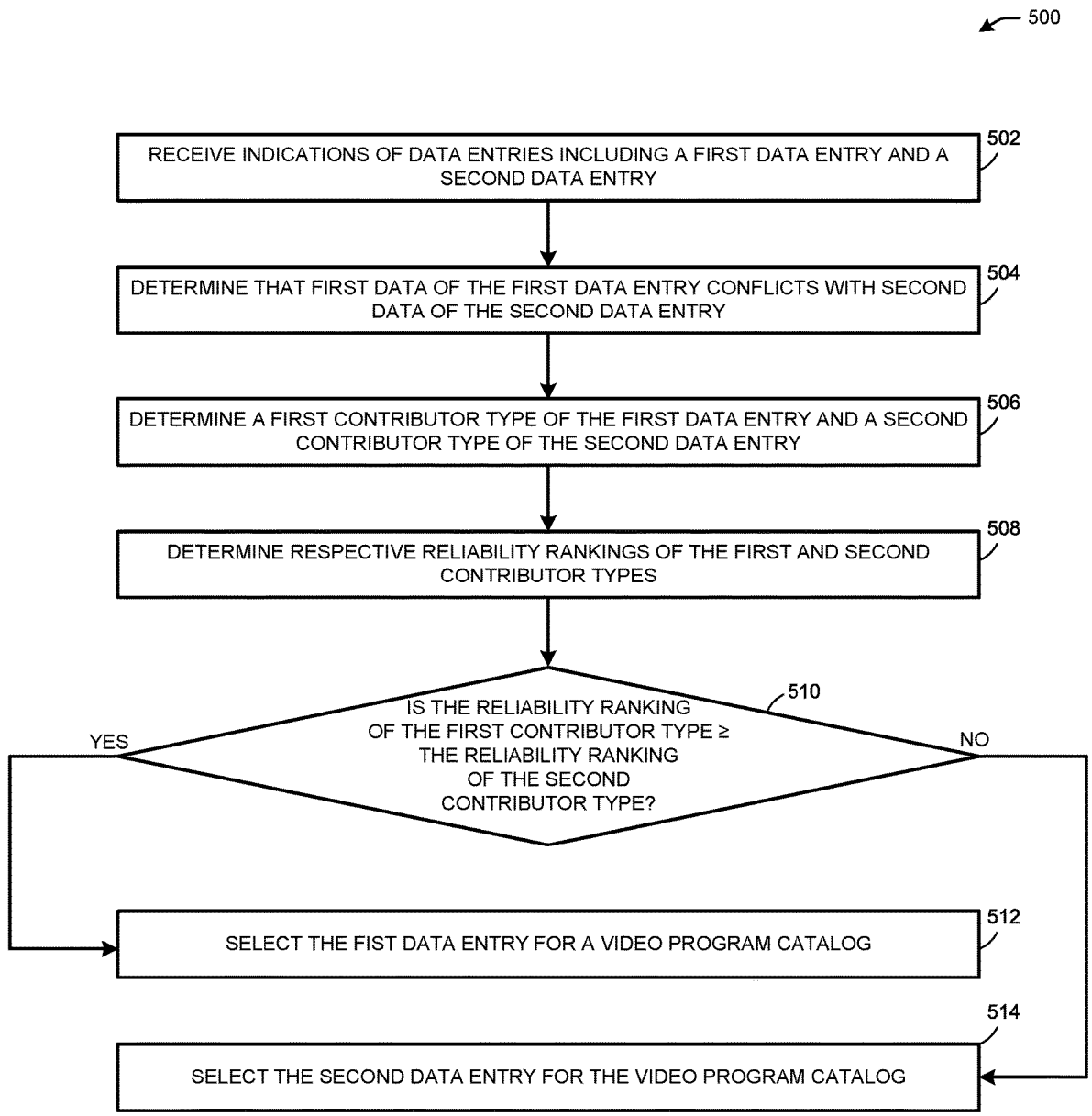
FIG. 5 illustrates a flow diagram for a process for determining video data using contributor trust, in accordance with one or more example embodiments of the present disclosure.

FIG. 5 illustrates a flow diagram for a process 500 for determining video data using contributor trust, in accordance with one or more example embodiments of the present disclosure.

At block 502, processing circuitry of a device, processing circuitry of a device, (e.g., streaming video system 202 of FIG. 2) may receive one or more indications of data entries (e.g., provided by the one or more contributing systems 210 through the input API of FIG. 2). The indications of the data entries may include a first timestamp, and the data entries may be associated with schemas including data for a video program documented by a video catalog. For example, the listener 220 of FIG. 2 may identify an identifier associated with a data entry by listening to the entity manager 218 of FIG. 2. Based on the type of data entry (e.g., bibliographic data, video coding data, legal data, artwork, etc.), a schema may be associated with the entry, and any contributed data of a similar type may be associated with the schema.

At block 504, the processing circuitry of the device may determine a data conflict among the data entries. A first data entry may conflict with another data entry received either prior to or later than the receipt of the first data entry. The conflicting data entries may have been submitted by different contributors. Determining a conflict may include determining that data representing the same information (e.g., a video title, video coding rate, subtitles, etc.) may not match. Data entries of related types may be coupled together, so a conflicting data entry may include matching data of one type, but conflicting data of another. For example, if video coding rate and video frame rate are coupled, a conflict may occur between video coding rate entries, but not video frame rate entries, or vice versa.

At block 506, the processing circuitry of the device may determine a contributors of the conflicting data entries. A data entry of a contribution may indicate a contributor using one or more identifiers. The contributor identifier may be coupled together with other information, such as an application identifier indicative of an application for which a contribution is intended. Using the identifiers, the device may determine the contributors or type of contributors who provided any given data.

At block 508, the processing circuitry of the device may determine reliability rankings of the contributors. For example, if the device receives indications of the contributors, the device may request reliability rankings for each of the contributors. The reliability rankings may be stored on the device or on another device. The device may receive the reliability rankings associated with the identified contributors. The rankings may indicate a trust/reliability of the contributors based on the type of contributors and/or historical accuracy/error rates.

At block 510, the processing circuitry of the device may determine whether the reliability ranking of a contributor of a first data entry is greater than the reliability ranking of a contributor of a second and conflicting data entry. If the reliability ranking indicates that the first contributor is more reliable, then the process 500 may, at block 512, select the first data entry of the conflicting data entries to be sent for publishing in the catalog. If the reliability ranking of the second contributor is higher than the reliability ranking of the first contributor, the process 500 may continue to block 514, where the device may select the second data entry of the conflicting data entries to be sent for publishing in the catalog.

Figure 6:
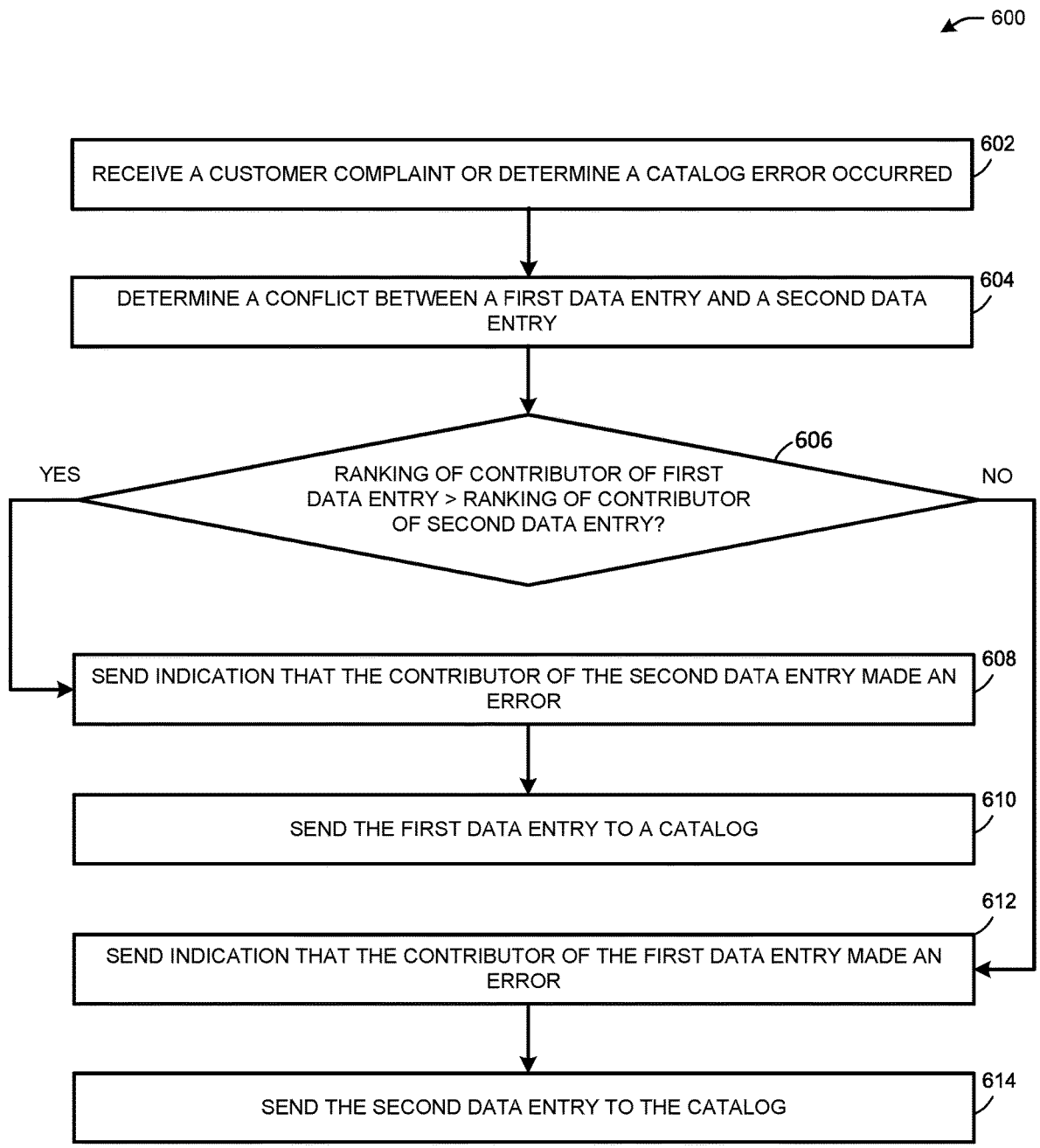
FIG. 6 illustrates a flow diagram for a process for determining video data using contributor trust, in accordance with one or more example embodiments of the present disclosure.

FIG. 6 illustrates a flow diagram for a process 600 for determining video data using contributor trust, in accordance with one or more example embodiments of the present disclosure.

At block 602, processing circuitry of a device, processing circuitry of a device, (e.g., streaming video system 202 of FIG. 2) may receive a customer complaint indicating an error in the catalog information presented or in playback. For example, a typographical error may be identified in bibliographic data, bibliographic data may be inaccurate, subtitles may be inaccurate or may not align with the audio, etc. The device also may determine if there is a catalog error (e.g., video encoding error). If streaming video fails to download and play, a pipeline error may be detected. Either scenario may cause the device to examine data associated with the error and determine whether an error occurs.

At block 604, the processing circuitry of the device may determine a conflict between data entries. For example, if conflicting data entries representing the same information (e.g., a video title) do not match, a conflict may exist, and the device may determine which conflicting data to use. Searching for conflicts may include searching schemas for related types of data. Because similar types of data may be coupled, data entries with multiple types of data may conflict even when some data within the different entries is the same. For example, if bibliographic data such as title and date are coupled, then a conflict may be identified when the dates in separate entries do not match even if the titles in the respective entries match.

At block 606, the processing circuitry of the device may determine if a contributor of one conflicting data entry has a higher reliability score than a contributor of another data entry. Contributor reliability scores may be based on a type of contributor and/or historical error/accuracy rates. If the reliability ranking of a first contributor is higher than the reliability ranking of a second contributor of a conflicting data entry, then the process 600 may continue to block 608 where the device may send an indication that the contributor of the second data entry and having the lower reliability ranking made an error (e.g., the conflicting data entry was a mistake). The error indication may be used to update reliability rankings over time. At block 610, the device may send the first data entry (e.g., the correct entry based on reliability rankings) to a catalog or a device responsible for publishing the catalog. If the reliability ranking of the second contributor is higher than the reliability ranking of the first contributor, the process 600 may continue to block 612.

At block 612, the processing circuitry of the device may send an indication that the first contributor was in error with regard to the conflicting data entry so that the reliability rankings maybe updated. At block 614, the processing circuitry of the device may send the second data entry (e.g., the correct entry) to the catalog or to a device which publishes the catalog. This way, the catalog may be updated to reflect the correct data entries identified by reliability rankings of contributors.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:

receiving, using an interface of a device, a first data entry, wherein the first data entry includes a first timestamp and an indication of a first contributor, and wherein the first data entry is associated with a video program;

determining a data type of the first data entry;

receiving, based on the data type, a second data entry included in a catalog, the second data entry having the data type and associated with the video program, wherein the catalog has been presented, wherein the second data entry includes a second timestamp and an indication of a second contributor, and wherein the first timestamp indicates a first time subsequent to a second time indicated by the second timestamp;

determining that the first data entry and the second data entry do not match;

determining a first ranking of the first contributor, wherein the first ranking is indicative of a reliability of the first contributor;

determining a second ranking of the second contributor, wherein the second ranking is indicative of a reliability of the second contributor;

replacing, based on a comparison of the first ranking to the second ranking, the second data entry in the catalog with the first data entry; and decreasing, based on the replacing of the second data entry in the catalog with the first data entry, the second ranking.

2. The method of claim 1, wherein the first contributor is a first type of contributor, wherein the second contributor is a second type of contributor, wherein the first ranking is based on the first type of contributor, and wherein the second ranking is based on the second type of contributor.

3. The method of claim 1, further comprising sending a request for one or more data entries having the data type, the one or more data entries comprising the second data entry, wherein the second data entry is received based on the request.

4. The method of claim 3, further comprising receiving an indication of a user complaint or a catalog error, wherein sending the request is based on receiving the indication.

5. A method comprising:
receiving, by a device, first data associated with a video program, wherein the first data are received from a first contributor, the first contributor having a first reliability ranking;
determining a data type of the first data;
determining, based on the data type, second data included in a video catalog and associated with the video program, wherein the video catalog has been presented, and wherein the second data have the data type and are received from a second contributor, the second contributor having a second reliability ranking;
determining that the first reliability ranking is higher than the second reliability ranking;
replacing the second data in the video catalog with the first data; and
decreasing, based on the replacing of the second data in the video catalog with the first data, the second reliability ranking.

6. The method of claim 5, further comprising:
generating a first workflow based on the first data, wherein determining the second data is based on the first workflow;
generating a second workflow based on the second data; and
determining, based on at least one of the first workflow or the second workflow, that the first data and the second data do not match.

7. The method of claim 5, wherein the first data are associated with video coding information, wherein the first data and the second data include a video bit rate, a video coding rate, video frame rate, or video resolution.

8. The method of claim 5, wherein the first data are associated with playable content, wherein the first data and the second data include video frames, audio, or subtitles.

9. The method of claim 5, wherein the first data are associated with descriptive data for the video program, wherein the first data and the second data include a video title, a video synopsis, a video date, or a performer associated with the video program.

10. The method of claim 5, further comprising:
determining a first tuple indicative of the first contributor and an application identifier; and
determining a second tuple indicative of the second contributor and the application identifier.

11. The method of claim 5, further comprising:
determining a first contributor type associated with the first contributor, the first contributor type associated with a system operator; and
determining a second contributor type associated with the second contributor, the second contributor type associated with a provider of the video program, wherein the first reliability ranking is based on the first contributor type being associated with the system operator, and wherein the second reliability ranking is based on the second contributor type being associated with the provider of the video program.

12. The method of claim 5, wherein the first reliability ranking is based on an error history of the first contributor, wherein an error is indicative of an incorrect data entry.

13. The method of claim 12, further comprising:
sending an indication that the second data includes an incorrect data entry.

14. The method of claim 5, further comprising:
receiving third data, wherein the third data is associated with the video program, the third data received from a third contributor having a third reliability ranking;
determining that the third data does not match the first data;
determining that the first reliability ranking is higher than the third reliability ranking; and
maintaining the first data in the video catalog based on the first reliability ranking being higher than the third reliability ranking.

15. The method of claim 5, further comprising receiving a customer complaint indicating an incorrect data entry.

16. The method of claim 5, further comprising determining an encoding error associated with playback of the video program.

17. A device comprising memory coupled to at least one processor, the at least one processor configured to:
receive first data associated with a video program, wherein the first data are received from a first contributor, the first contributor having a first reliability ranking;
determine a data type associated with the first data;
determine, based on the data type, second data included in a video catalog and associated with the video program, wherein the video catalog has been presented, and wherein the second data have the data type and are received from a second contributor, the second contributor having a second reliability ranking;
determine that the first reliability ranking is higher than the second reliability ranking;
replace the second data in the video catalog with the first data; and
decrease, based on the replacing of the second data in the video catalog with the first data, the second reliability ranking.

18. The device of claim 17, wherein the processor is further configured to:
generate a first workflow based on the first data, wherein to determine the second data is based on the first workflow;
generate a second workflow based on the second data; and
determine, based on at least one of the first workflow or the second workflow, that the first data and the second data do not match.

19. The device of claim 17, wherein the processor is further configured to:
determine a first tuple indicative of the first contributor and an application identifier; and determine a second tuple indicative of the second contributor and the application identifier.

20. The device of claim 17, wherein the at least one processor is further configure to:
- determine a first contributor type associated with the first contributor, the first contributor type associated with a system operator; and
- determine a second contributor type associated with the second contributor, the second contributor type associated with a provider of the video program, wherein the first reliability ranking is based on the first contributor type being associated with the system operator, and wherein the second reliability ranking is based on the second contributor type being associated with the provider of the video program.

* * * * *